(12) United States Patent
Idogawa et al.

(10) Patent No.: US 11,215,146 B2
(45) Date of Patent: Jan. 4, 2022

(54) ENGINE DEVICE

(71) Applicant: TOYOTA JIDOSHA KABUSHIKI KAISHA, Aichi-ken (JP)

(72) Inventors: Masanao Idogawa, Nagoya (JP); Takahiro Uchida, Okazaki (JP); Masahiro Kachi, Nagakute (JP); Reiko Goh, Toyota (JP); Hirokatsu Yamamoto, Chita (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/234,802

(22) Filed: Apr. 20, 2021

(65) Prior Publication Data
US 2021/0363944 A1    Nov. 25, 2021

(30) Foreign Application Priority Data
May 22, 2020    (JP) .............................. JP2020-090132

(51) Int. Cl.
*F02M 1/00*     (2006.01)
*F02M 25/08*    (2006.01)
*F02D 41/00*    (2006.01)

(52) U.S. Cl.
CPC ..... *F02M 25/0836* (2013.01); *F02D 41/0032* (2013.01); *F02M 25/089* (2013.01); *F02D 41/0007* (2013.01)

(58) Field of Classification Search
CPC ................ F02D 2250/02; F02M 25/08; F02M 25/0836; F02M 25/0872; F02M 25/089; F02M 55/007

USPC .................. 123/516, 518, 520, 522
See application file for complete search history.

(56) References Cited

U.S. PATENT DOCUMENTS

| 5,368,002 A | * | 11/1994 | Hoshino | ............. | F02D 41/0045 |
| | | | | | 123/198 D |
| 5,680,849 A | * | 10/1997 | Morikawa | ........... | F02D 41/0042 |
| | | | | | 123/198 D |
| 5,765,539 A | * | 6/1998 | Isobe | .................. | F02M 25/0809 |
| | | | | | 123/198 D |
| 5,954,034 A | * | 9/1999 | Takagi | ............... | F02M 25/0809 |
| | | | | | 123/520 |
| 6,367,459 B1 | * | 4/2002 | Yoshioka | ............ | F02D 41/0035 |
| | | | | | 123/516 |
| 6,736,117 B2 | * | 5/2004 | Isobe | .................. | F02M 25/0809 |
| | | | | | 123/520 |

(Continued)

FOREIGN PATENT DOCUMENTS

JP            201952561 A      4/2019

*Primary Examiner* — John Kwon
(74) *Attorney, Agent, or Firm* — Hauptman Ham, LLP

(57) ABSTRACT

When an execution condition for a purge of supplying evaporated fuel gas to an intake pipe is met, a required purge ratio is set within a range equal to or higher than a lower-limit purge ratio, and a purge control valve is controlled using a driving duty based on the required purge ratio. In this case, when the execution condition is continuously met, an ejector pressure is estimated based on a pressure difference between a supercharging pressure and a pre-compressor pressure, and on the driving duty, and the lower-limit purge ratio is set based on a post-throttle-valve pressure and on the ejector pressure. The value of the lower-limit purge ratio is set to zero immediately after the execution condition switches from being not met to being met.

5 Claims, 11 Drawing Sheets

(56) References Cited

U.S. PATENT DOCUMENTS

| | | | | |
|---|---|---|---|---|
| 6,932,068 B2* | 8/2005 | Osanai | ................. | F02D 41/004 |
| | | | | 123/520 |
| 2001/0003978 A1* | 6/2001 | Kitajima | ............ | F02M 25/0809 |
| | | | | 123/518 |
| 2003/0226549 A1* | 12/2003 | Takagi | ............... | F02M 25/0818 |
| | | | | 123/520 |
| 2004/0129259 A1* | 7/2004 | Mitsutani | ............ | F02D 41/2451 |
| | | | | 123/698 |
| 2007/0199548 A1* | 8/2007 | Maegawa | .......... | F02M 25/0809 |
| | | | | 123/520 |
| 2020/0025156 A1 | 1/2020 | Mizushima et al. | | |

\* cited by examiner

ENGINE DEVICE

CROSS-REFERENCE TO RELATED APPLICATION

This application claims priority to Japanese Patent Application No. 2020-090132 filed on May 22, 2020, incorporated herein by reference in its entirety.

BACKGROUND

1. Technical Field

The present disclosure relates to an engine device.

2. Description of Related Art

An engine device of the type in question has been hitherto proposed that includes a first purge passage through which evaporated fuel gas containing evaporated fuel is supplied for purging to an intake pipe of an engine, downstream of a throttle valve, and a second purge passage through which the evaporated fuel gas is supplied for purging to the intake pipe, upstream of a compressor of a turbocharger, by an ejector that generates a negative pressure using a supercharging pressure from the turbocharger (e.g., see Japanese Patent Application Publication No. 2019-052561). In this engine device, an intake pipe pressure that is a pressure inside the intake pipe, downstream of the throttle valve, and a pressure generated by the ejector are compared to detect through which of the first purge passage and the second purge passage the purge is performed. When the purge passage switches between the first purge passage and the second purge passage, control characteristic data used for controlling a purge control valve is switched between first control characteristic data suitable for the first purge passage and second control characteristic data suitable for the second purge passage.

SUMMARY

In such an engine device, when a purge execution condition is met, the pressure generated by the ejector is estimated based on a pressure difference between the supercharging pressure and a pre-compressor pressure that is a pressure inside the intake pipe, upstream of the compressor, and on a driving duty of the purge control valve, and a lower-limit purge ratio is set based on the estimated pressure generated by the ejector. Then, a required purge ratio is set within a range equal to or higher than the lower-limit purge ratio, and the purge control valve is controlled using a driving duty based on the required purge ratio. In this case, immediately after the purge execution condition switches from being not met to being met, the driving duty is not yet set and therefore the pressure generated by the ejector, the lower-limit purge ratio, and the required purge ratio cannot be set. This makes how to control the purge control valve a challenge.

A main object of an engine device of the present disclosure is to make it possible to control a purge control valve immediately after a purge execution condition switches from being not met to being met.

The engine device of the present disclosure has adopted the following solutions to achieve this main object.

The gist of the engine device of the present disclosure is as follows:

An engine device including:
an engine that has a throttle valve disposed in an intake pipe and outputs power using fuel supplied from a fuel tank;
a turbocharger having a compressor disposed in the intake pipe, upstream of the throttle valve;
an evaporated fuel processing device having
a supply passage that splits into a first purge passage and a second purge passage that are connected to the intake pipe, downstream of the throttle valve, and supplies evaporated fuel gas containing evaporated fuel generated inside the fuel tank to the intake pipe,
an ejector having an intake port connected to a recirculation passage extending from the intake pipe, between the compressor and the throttle valve, an exhaust port connected to the intake pipe, upstream of the compressor, and a suction port connected to the second purge passage, and
a purge control valve provided in the supply passage; and
a controller that, when an execution condition for a purge of supplying the evaporated fuel gas to the intake pipe is met, sets a required purge ratio within a range equal to or higher than a lower-limit purge ratio, and controls the purge control valve using a driving duty based on the required purge ratio, wherein:
when the execution condition is continuously met, the controller estimates an ejector pressure that is a pressure at the suction port of the ejector, based on a pressure difference between a supercharging pressure that is a pressure inside the intake pipe, between the compressor and the throttle valve, and a pre-compressor pressure that is a pressure inside the intake pipe, upstream of the compressor, and on the driving duty, and sets the lower-limit purge ratio based on a post-throttle-valve pressure that is a pressure inside the intake pipe, downstream of the throttle valve, and on the ejector pressure; and
the controller sets the value of the lower-limit purge ratio to zero immediately after the execution condition switches from being not met to being met.

In the engine device of the present disclosure, when the execution condition for the purge of supplying evaporated fuel gas to the intake pipe is met, the required purge ratio is set within a range equal to or higher than the lower-limit purge ratio, and the purge control valve is controlled using a driving duty based on the required purge ratio. In this case, when the execution condition is continuously met, the ejector pressure that is a pressure at the suction port of the ejector is estimated based on a pressure difference between the supercharging pressure that is a pressure inside the intake pipe, between the compressor and the throttle valve, and the pre-compressor pressure that is a pressure inside the intake pipe, upstream of the compressor, and on the driving duty, and the lower-limit purge ratio is set based on the post-throttle-valve pressure that is a pressure inside the intake pipe, downstream of the throttle valve, and on the ejector pressure. The value of the lower-limit purge ratio is set to zero immediately after the execution condition switches from being not met to being met. Thus, immediately after the execution condition switches from being not met to being met, i.e., when the driving duty is not yet set and therefore the ejector pressure cannot be estimated, the purge control valve can be controlled by setting the required purge ratio within a range equal to or higher than the lower-limit purge ratio. The lower-limit purge ratio means a purge ratio at which a relationship between a driving current application time of the purge control valve and a purge flow rate switches from a non-linear shape to a linear shape (a lower limit of a range of the purge ratio in which the purge flow rate can be accurately controlled by controlling the opening degree of the purge control valve).

In the engine device of the present disclosure, the controller may set the value of the lower-limit purge ratio to zero and set the value of the required purge ratio to zero immediately after the execution condition switches from being not met to being met. Thus, a situation where the required purge ratio assumes a positive value near zero immediately after the execution condition switches from being not met to being met can be avoided, and thereby a situation where the purge control valve is controlled within a range in which a relationship between a driving current application time of the purge control valve and a purge flow rate has a non-linear shape can be avoided.

In the engine device of the present disclosure, the controller may set the lower-limit purge ratio based on the post-throttle-valve pressure when, immediately after the execution condition switches from being not met to being met, the purge does not include a second purge of supplying the evaporated fuel gas to the intake pipe through the second purge passage. This is because when the purge does not include the second purge, the post-throttle-valve pressure is sufficiently lower (higher as a negative pressure) than the ejector pressure and a lower-limit current application time is affected by the post-throttle-valve pressure.

In this case, in an inference process in which it is inferred that the purge does not include the second purge when the post-throttle-valve pressure is lower than a threshold value and it is inferred that the purge includes the second purge when the post-throttle-valve pressure is equal to or higher than the threshold value, the controller may maintain an inference that the purge includes the second purge until a predetermined time elapses when the post-throttle-valve pressure that has been equal to or higher than the threshold value becomes lower than the threshold value. Thus, whether the purge includes the second purge can be estimated.

In the engine device of the present disclosure, when a variable upper-limit purge ratio is equal to or higher than the lower-limit purge ratio, the controller may set the required purge ratio within a range equal to or lower than the upper-limit purge ratio and equal to or higher than the lower-limit purge ratio, and when the upper-limit purge ratio is lower than the lower-limit purge ratio, the controller may set the value of the required purge ratio to zero. Thus, a situation where the required purge ratio becomes higher than the upper-limit purge ratio can be avoided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described using an embodiment.

Figure 1:
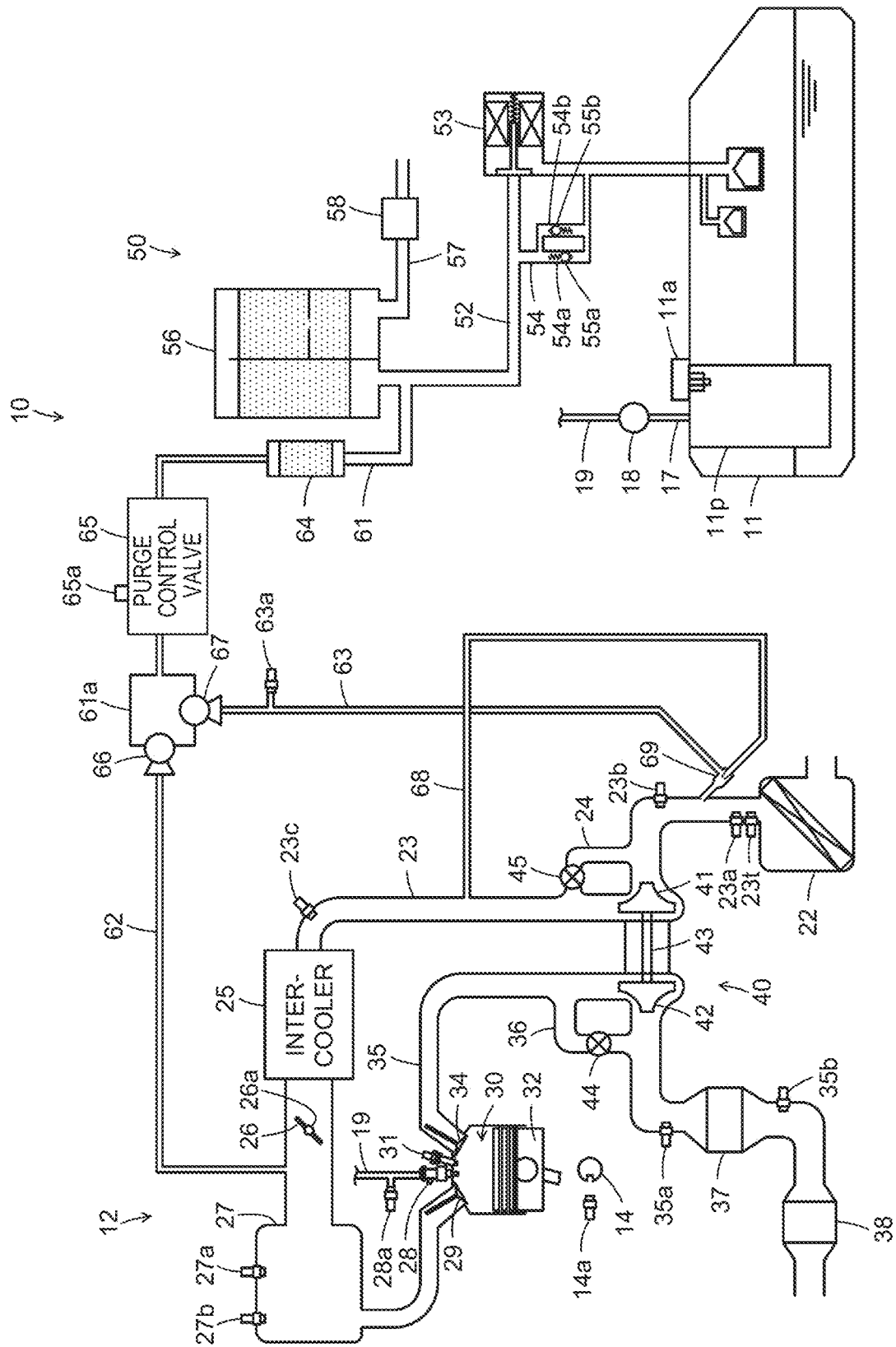
FIG. 1 is a configuration diagram showing an overview of the configuration of an engine device 10.
Figure 2:
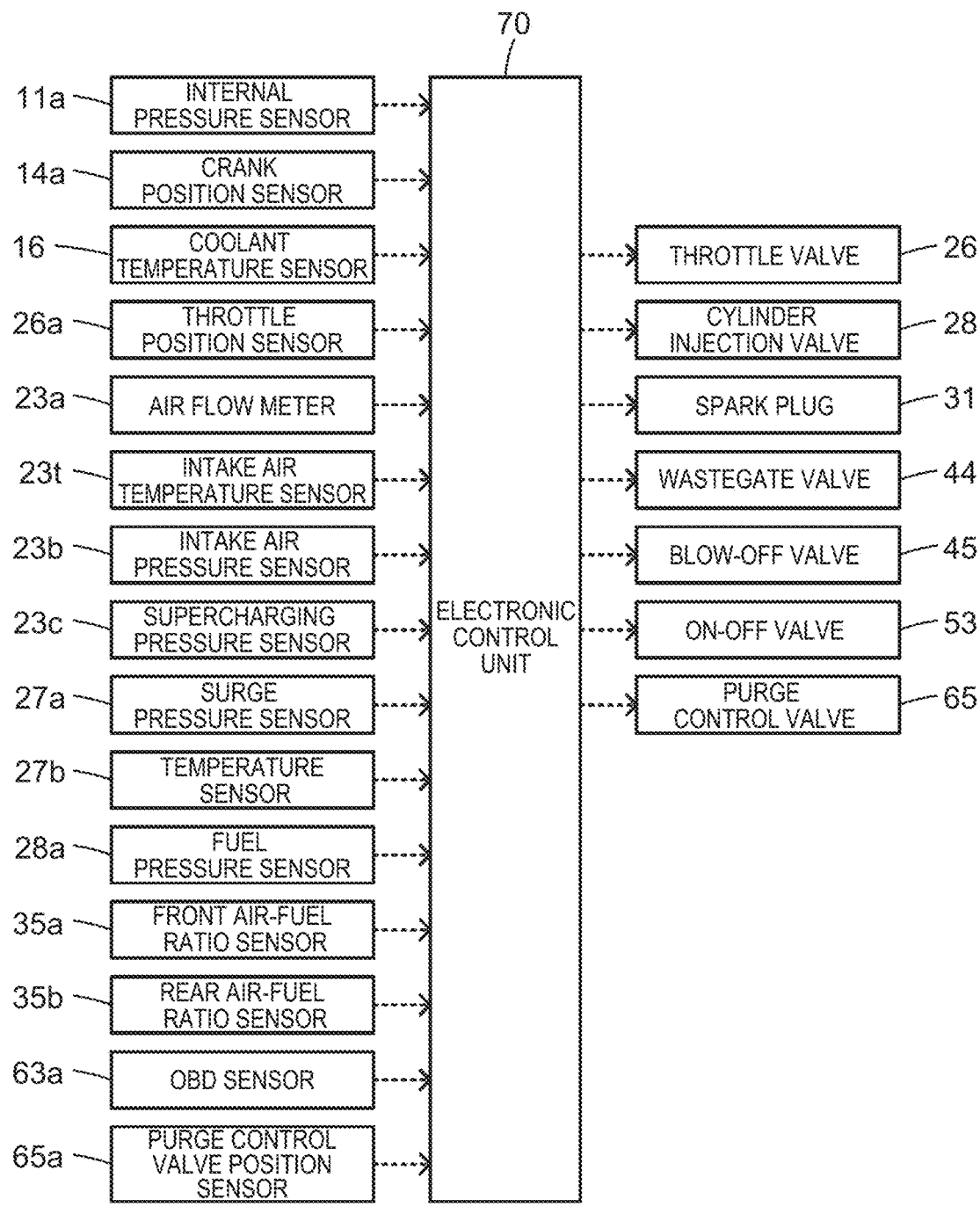
FIG. 2 is a chart illustrating examples of input and output signals of an electronic control unit 70.

FIG. 1 is a configuration diagram showing an overview of the configuration of an engine device 10 as one embodiment of the present disclosure, and FIG. 2 is a chart illustrating examples of input and output signals of an electronic control unit 70. The engine device 10 of the embodiment is installed in ordinary vehicles that travel using power from an engine 12, or various types of hybrid vehicles that are equipped with a motor in addition to the engine 12. As shown in FIG. 1 and FIG. 2, the engine device 10 includes the engine 12, a turbocharger 40, an evaporated fuel processing device 50, and the electronic control unit 70.

The engine 12 is configured as an internal combustion engine that outputs power using fuel, such as gasoline or light oil, supplied from a fuel tank 11. In the engine 12, air cleaned by an air cleaner 22 is taken into an intake pipe 23 and passed through an intercooler 25, a throttle valve 26, and a surge tank 27 in this order. Then, fuel is injected from a cylinder injection valve 28 mounted on a combustion chamber 30 to the air taken into the combustion chamber 30 through an intake valve 29. The air and the fuel thus mixed together undergo explosive combustion caused by an electric spark from a spark plug 31. The engine 12 converts reciprocating motion of a piston 32 that is pushed down by the energy of this explosive combustion into rotating motion of a crankshaft 14. Exhaust gas discharged from the combustion chamber 30 to an exhaust pipe 35 through an exhaust valve 34 is discharged into outside air through exhaust gas control apparatuses 37, 38 having a catalyst (three-way catalyst) that removes harmful components, such as carbon monoxide (CO), hydrocarbon (HC), and nitrogen oxides (NOx). The fuel is supplied from the fuel tank 11 to the cylinder injection valve 28 through a feed pump 11$p$, a low-pressure-side fuel passage 17, a high-pressure pump 18, and a high-pressure-side fuel passage 19. The high-pressure pump 18 is driven by power from the engine 12 to pressurize the fuel in the low-pressure-side fuel passage 17 and supply the pressurized fuel to the high-pressure-side fuel passage 19.

The turbocharger 40 is configured as a turbocharger including a compressor 41, a turbine 42, a rotating shaft 43, a wastegate valve 44, and a blow-off valve 45. The compressor 41 is disposed in the intake pipe 23, upstream of the intercooler 25. The turbine 42 is disposed in the exhaust pipe 35, upstream of the exhaust gas control apparatus 37. The rotating shaft 43 couples the compressor 41 and the turbine 42 to each other. The wastegate valve 44 is provided in a bypass pipe 36 that couples two points in the exhaust pipe 35, one upstream and the other downstream of the turbine 42, to each other, and is controlled by the electronic control unit 70. The blow-off valve 45 is provided in a bypass pipe 24 that couples two points in the intake pipe 23, one upstream and the other downstream of the compressor 41, to each other, and is controlled by the electronic control unit 70.

In the turbocharger 40, the opening degree of the wastegate valve 44 is adjusted to thereby adjust the distribution ratio between the amount of exhaust gas flowing through the bypass pipe 36 and the amount of exhaust gas flowing through the turbine 42, the rotary driving force of the turbine 42, the amount of air compressed by the compressor 41, and the supercharging pressure (intake air pressure) of the engine 12. Specifically, the distribution ratio is adjusted such that when the opening degree of the wastegate valve 44 is smaller, the amount of exhaust gas flowing through the bypass pipe 36 is smaller and the amount of exhaust gas flowing through the turbine 42 is larger. When the wastegate valve 44 is fully open, the engine 12 can operate like a naturally aspirated engine that is not equipped with the turbocharger 40.

In the turbocharger 40, when the pressure inside the intake pipe 23, downstream of the compressor 41, is to some extent higher than the pressure upstream thereof, opening the blow-off valve 45 can release an excessive pressure on a downstream side of the compressor 41. Instead of being a valve controlled by the electronic control unit 70, the blow-off valve 45 may be configured as a check valve that opens when the pressure inside the intake pipe 23, downstream of the compressor 41, becomes to some extent higher than the pressure upstream thereof.

The evaporated fuel processing device 50 is a device that performs a purge of supplying evaporated fuel gas (purge gas) generated inside the fuel tank 11 to the intake pipe 23 of the engine 12, and includes an introduction passage 52, an on-off valve 53, a bypass passage 54, relief valves 55a, 55b, a canister 56, a common passage 61, a first purge passage 62, a second purge passage 63, a buffer part 64, a purge control valve 65, check valves 66, 67, a recirculation passage 68, and an ejector 69. The introduction passage 52 and the common passage 61 correspond to the "supply passage" of the embodiment.

The introduction passage 52 is connected to the fuel tank 11 and the canister 56. The on-off valve 53 is provided in the introduction passage 52 and configured as a normally closed solenoid valve. The on-off valve 53 is controlled by the electronic control unit 70.

The bypass passage 54 forms a bypass connecting two points in the introduction passage 52, one on the side of the fuel tank 11 and the other on the side of the canister 56 relative to the on-off valve 53, and has two branches 54a, 54b that split from the bypass passage 54 and then merge. The relief valve 55a is provided in the branch 54a and configured as a check valve, and opens when the pressure on the side of the fuel tank 11 becomes to some extent higher than the pressure on the side of the canister 56. The relief valve 55b is provided in the branch 54b and configured as a check valve, and opens when the pressure on the side of the canister 56 becomes to some extent higher than the pressure on the side of the fuel tank 11.

The canister 56 is connected to the introduction passage 52 and opens to the atmosphere through an atmospheric release passage 57. An inside of the canister 56 is filled with an adsorbent, such as activated carbon, that can adsorb evaporated fuel from the fuel tank 11. The atmospheric release passage 57 is provided with an air filter 58.

The common passage 61 is connected to the introduction passage 52, near the canister 56, and splits at a split point 61a into the first purge passage 62 and the second purge passage 63. The first purge passage 62 is connected to the intake pipe 23, between the throttle valve 26 and the surge tank 27. The second purge passage 63 is connected to a suction port of the ejector 69.

The buffer part 64 is provided in the common passage 61. An inside of the buffer part 64 is filled with an adsorbent, such as activated carbon, that can adsorb evaporated fuel from the fuel tank 11 and the canister 56. The purge control valve 65 is provided in the common passage 61, on the side of the split point 61a relative to the buffer part 64. The purge control valve 65 is configured as a normally closed solenoid valve. The purge control valve 65 is controlled by the electronic control unit 70.

The check valve 66 is provided in the first purge passage 62, near the split point 61a. The check valve 66 allows the evaporated fuel gas (purge gas) containing evaporated fuel to flow through a purge passage 60 in a direction from the side of the common passage 61 toward the side of the first purge passage 62 (intake pipe 23) and prohibits the evaporated fuel gas from flowing in the opposite direction. The check valve 67 is provided in the second purge passage 63, near the split point 61a. The check valve 67 allows the evaporated fuel gas to flow through the purge passage 60 in a direction from the side of the common passage 61 toward the side of the second purge passage 63 (ejector 69) and prohibits the evaporated fuel gas from flowing in the opposite direction.

The recirculation passage 68 is connected to the intake pipe 23, between the compressor 41 and the intercooler 25, and to an intake port of the ejector 69. The ejector 69 has the intake port, the suction port, and an exhaust port. The ejector 69 has the intake port connected to the recirculation passage 68, the suction port connected to the second purge passage 63, and the exhaust port connected to the intake pipe 23, upstream of the compressor 41. A leading end part of the intake port has a tapered shape.

In the ejector 69, a pressure difference occurs between the intake port and the exhaust port when the turbocharger 40 is operating (when the pressure inside the intake pipe 23, between the compressor 41 and the intercooler 25, is a positive pressure), so that recirculating intake air (intake air that is recirculated from downstream of the compressor 41 in the intake pipe 23 through the recirculation passage 68) flows from the intake port toward the exhaust port. As the recirculating intake air is depressurized in the leading end part of the intake port, a negative pressure occurs near the leading end part. This negative pressure causes the evaporated fuel gas to be suctioned from the second purge passage 63 through the suction port, and this evaporated fuel gas is supplied, along with the recirculating intake air having a negative pressure, to the intake pipe 23, upstream of the compressor 41, through the exhaust port.

The evaporated fuel processing device 50 thus configured operates basically as follows: When the pressure inside the intake pipe 23, downstream of the throttle valve 26 (a surge pressure Ps to be described later) is a negative pressure and the on-off valve 53 and the purge control valve 65 are open, the check valve 66 opens, so that evaporated fuel gas (purge gas) generated inside the fuel tank 11 and evaporated fuel gas desorbed from the canister 56 are supplied to the intake pipe 23, downstream of the throttle valve 26, through the introduction passage 52, the common passage 61, and the first purge passage 62. Hereinafter, this action will be referred to as a "downstream purge." In this case, if the pressure inside the intake pipe 23, between the compressor 41 and the intercooler 25 (a supercharging pressure Pc to be described later) is a negative pressure or zero, the ejector 69 will not operate and therefore the check valve 66 will not open.

When the pressure inside the intake pipe 23, between the compressor 41 and the intercooler 25 (supercharging pressure Pc) is a positive pressure and the on-off valve 53 and the purge control valve 65 are open, the ejector 69 operates and the check valve 67 opens, so that the evaporated fuel gas is supplied to the intake pipe 23, upstream of the compressor 41, through the introduction passage 52, the common passage 61, the second purge passage 63, and the ejector 69. Hereinafter, this action will be referred to as an "upstream purge." In this case, the check valve 66 opens or closes according to the pressure inside the intake pipe 23, downstream of the throttle valve 26 (surge pressure Ps).

Thus, the evaporated fuel processing device 50 performs only the downstream purge or the upstream purge of the two types of purges, or both the downstream purge and the upstream purge, depending on the pressure inside the intake pipe 23, downstream of the throttle valve 26 (surge pressure Ps) and the pressure inside the intake pipe 23, between the compressor 41 and the intercooler 25 (supercharging pressure Pc).

The electronic control unit 70 is configured as a microprocessor centered around a CPU, and incudes, in addition to the CPU, a ROM that stores processing programs, a RAM that temporarily stores data, a non-volatile flash memory that stores and retains data, input and output ports, and a communication port. Signals from various sensors are input into the electronic control unit 70 through the input port.

Examples of the signals input into the electronic control unit 70 include a tank internal pressure Ptnk from an internal pressure sensor 11a that detects the pressure inside the fuel tank 11; a crank angle θcr from a crank position sensor 14a that detects the rotation position of the crankshaft 14 of the engine 12; a coolant temperature Tw from a coolant temperature sensor 16 that detects the temperature of a coolant in the engine 12; and a throttle valve opening degree TH from a throttle position sensor 26a that detects the opening degree of the throttle valve 26. A further example is a cam position θca from a cam position sensor (not shown) that detects the rotation position of an intake cam shaft that opens and closes the intake valve 29 or an exhaust cam shaft that opens and closes the exhaust valve 34. Further examples are an intake air amount Qa from an air flow meter 23a mounted on the intake pipe 23, upstream of the compressor 41; an intake air temperature Tin from an intake air temperature sensor 23t mounted on the intake pipe 23, upstream of the compressor 41; an intake air pressure (pre-compressor pressure) Pin from an intake air pressure sensor 23b mounted on the intake pipe 23, upstream of the compressor 41; and the supercharging pressure Pc from a supercharging pressure sensor 23c mounted on the intake pipe 23, between the compressor 41 and the intercooler 25. Further examples are the surge pressure (post-throttle-valve pressure) Ps from a surge pressure sensor 27a mounted on the surge tank 27, and a surge temperature Ts from a temperature sensor 27b mounted on the surge tank 27. A further example is a supply fuel pressure Pfd from a fuel pressure sensor 28a that detects the fuel pressure of fuel supplied to the cylinder injection valve 28. Further examples are a front air-fuel ratio AF1 from a front air-fuel ratio sensor 35a mounted on the exhaust pipe 35, upstream of the exhaust gas control apparatus 37, and a rear air-fuel ratio AF2 from a rear air-fuel ratio sensor 35b mounted on the exhaust pipe 35, between the exhaust gas control apparatus 37 and the exhaust gas control apparatus 38. Further examples are an opening degree Opv of the purge control valve 65 from a purge control valve position sensor 65a, and a sensor signal Pobd from an OBD sensor (pressure sensor) 63a mounted in the second purge passage 63.

Various control signals are output from the electronic control unit 70 through the output port. Examples of the signals output from the electronic control unit 70 include a control signal to the throttle valve 26, a control signal to the cylinder injection valve 28, and a control signal to the spark plug 31. Further examples are a control signal to the wastegate valve 44, a control signal to the blow-off valve 45, and a control signal to the on-off valve 53. Another example is a control signal to the purge control valve 65.

The electronic control unit 70 calculates a speed Ne and a load factor (a ratio of the volume of air actually taken into the engine 12 during one cycle relative to the stroke volume per cycle of the engine 12) KL of the engine 12. The speed Ne is calculated based on the crank angle θcr from the crank position sensor 14a. The load factor KL is calculated based on the intake air amount Qa from the air flow meter 23a and the speed Ne.

In the engine device 10 of the embodiment thus configured, the electronic control unit 70 performs, based on a required load factor KL* of the engine 12, modes of control including intake air amount control of controlling the opening degree of the throttle valve 26, fuel injection control of controlling the amount of fuel injected from the cylinder injection valve 28, ignition control of controlling the ignition timing of the spark plug 31, supercharge control of controlling the opening degree of the wastegate valve 44, and purge control of controlling the opening degree of the purge control valve 65. In the intake air amount control, the throttle valve 26 is controlled such that the throttle valve opening degree TH becomes smaller as the flow rate of evaporated fuel gas supplied to the intake pipe 23 under the purge control becomes higher. In the fuel injection control, the cylinder injection valve 28 is controlled such that the fuel injection amount becomes smaller as the flow rate of evaporated fuel gas supplied to the intake pipe 23 under the purge control becomes higher (and as the air-fuel ratio of the engine 12 shifts farther to a rich side accordingly).

Figure 3:
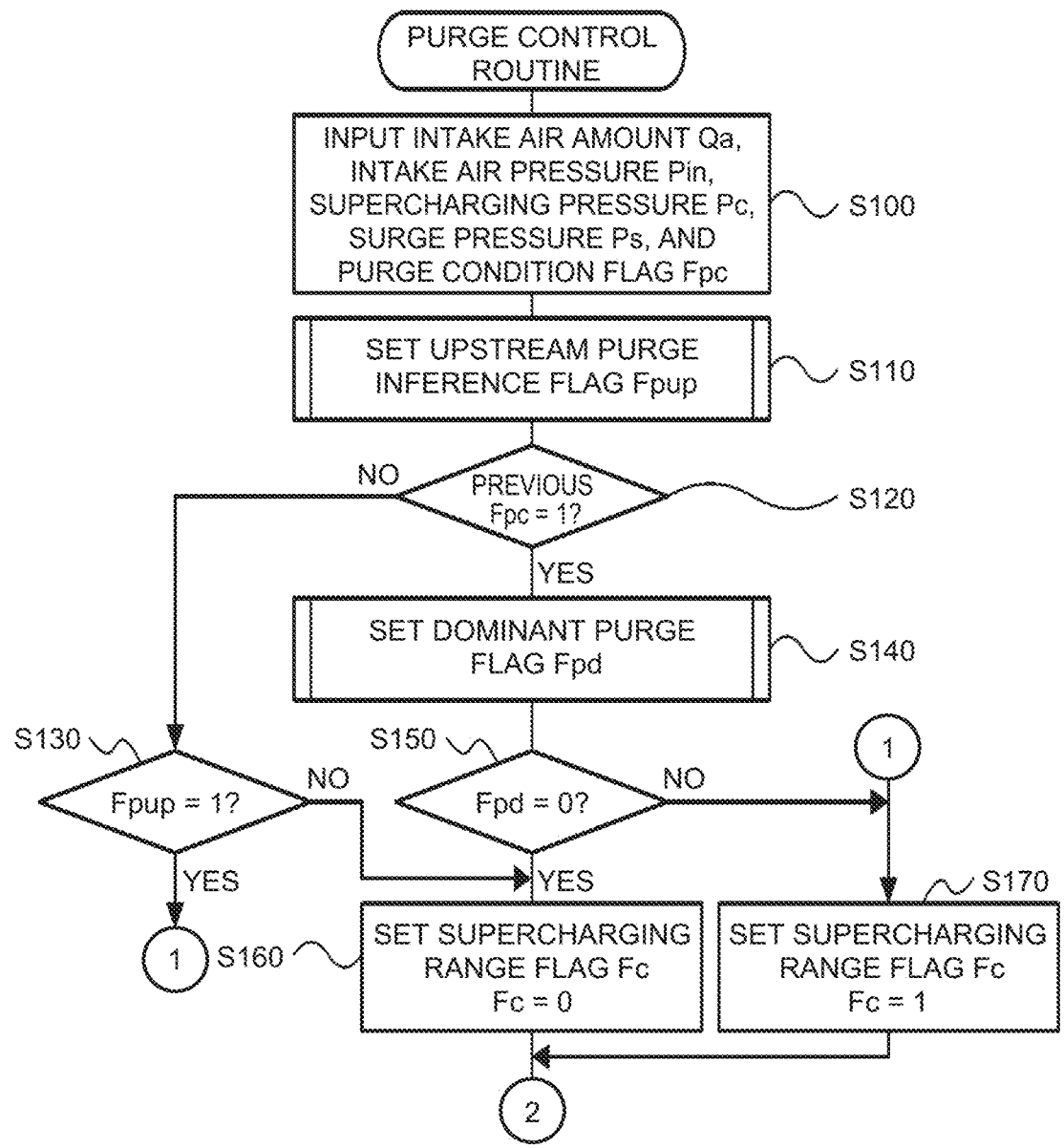
FIG. 3 is a flowchart (first half) showing one example of a purge control routine.
Figure 4:
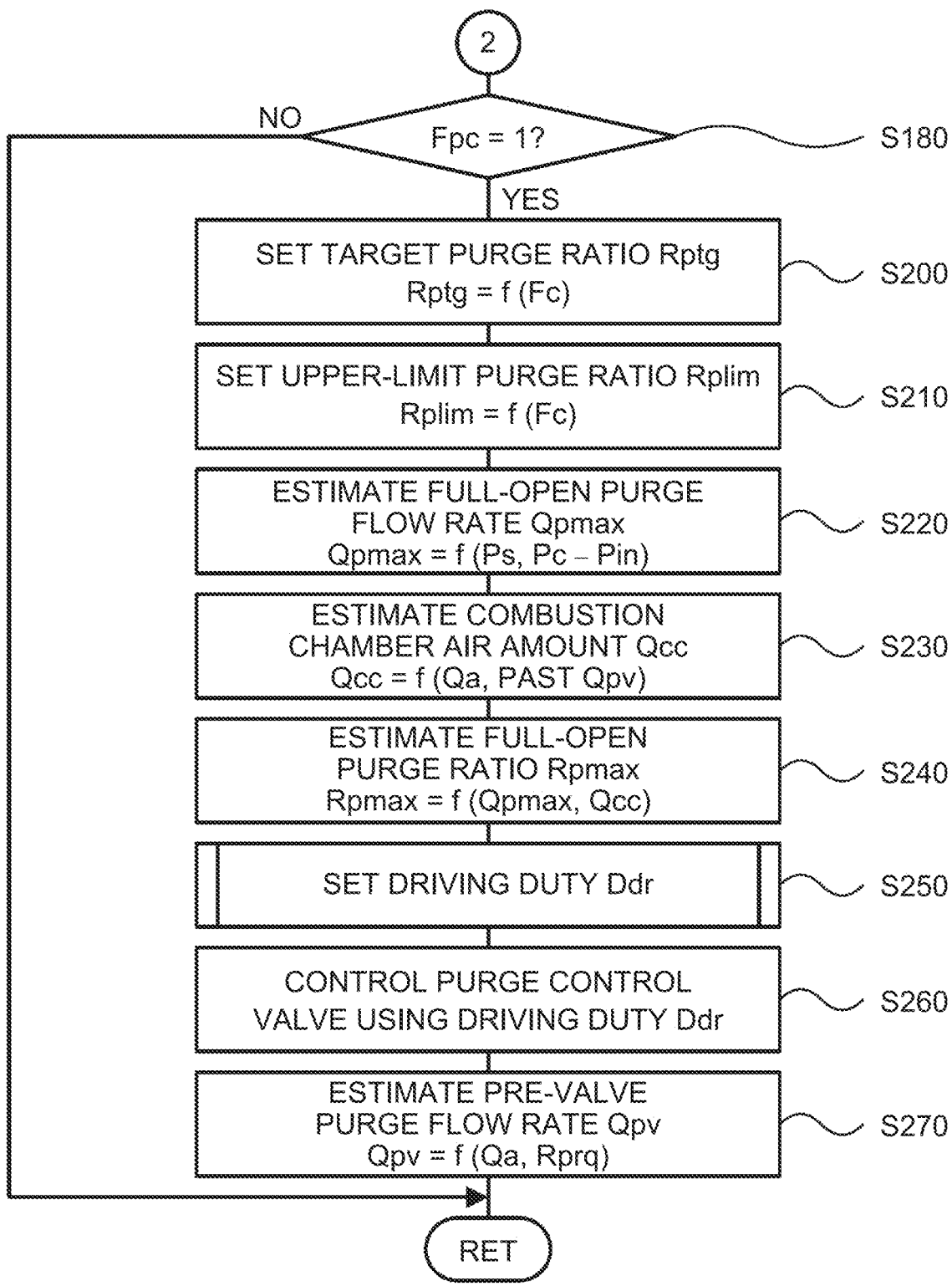
FIG. 4 is a flowchart (latter half) showing one example of the purge control routine.

Next, the operation of the engine device 10 of the embodiment, particularly, the purge control will be described. FIG. 3 and FIG. 4 are flowcharts showing one example of a purge control routine that is executed by the electronic control unit 70. This routine is repeatedly executed.

When the purge control routine of FIG. 3 and FIG. 4 is executed, the electronic control unit 70 first inputs pieces of data including the intake air amount Qa, the intake air pressure Pin, the supercharging pressure Pc, the surge pressure Ps, and a purge condition flag Fpc (step S100). As the intake air amount Qa, a value detected by the air flow meter 23a is input. As the intake air pressure Pin, a value detected by the intake air pressure sensor 23b is input. As the supercharging pressure Pc, a value detected by the supercharging pressure sensor 23c is input. As the surge pressure Ps, a value detected by the surge pressure sensor 27a is input. As the purge condition flag Fpc, a value set by a purge condition meeting determination routine (not shown) is input. In the purge condition meeting determination routine, the electronic control unit 70 sets the value of the purge condition flag Fpc to one when a purge condition is met, and sets the value of the purge condition flag Fpc to zero when the purge condition is not met. The value of the purge condition flag Fpc is set to zero as an initial value when a trip is started. As the purge condition, for example, a condition is used that operation control (the fuel injection control etc.) of the engine 12 is being performed and, at the same time, the coolant temperature Tw is equal to or higher than a threshold value Twref. As the threshold value Twref, for example, about 55° C. to 65° C. is used.

Subsequently, an upstream purge inference flag Fpup is set by the upstream purge inference process of FIG. 5 (step S110). The upstream purge inference flag Fpup is a flag indicating whether the purge includes the upstream purge, and the value thereof is set to one when it is inferred that the purge includes the upstream purge, and is set to zero when it is inferred that the purge does not include the upstream purge (includes only the downstream purge). That the purge includes the upstream purge means that at least part of evaporated fuel gas supplied to the combustion chamber 30 is evaporated fuel gas that is supplied through the second purge passage 63. The value of the upstream purge inference flag Fpup is set to zero as an initial value when a trip is started. In the embodiment, the value of the upstream purge inference flag Fpup when a purge is not being executed assumes that a purge is being executed. Here, the description of the purge control routine of FIG. 3 and FIG. 4 will be suspended to describe the upstream purge inference process of FIG. 5.

Figure 5:
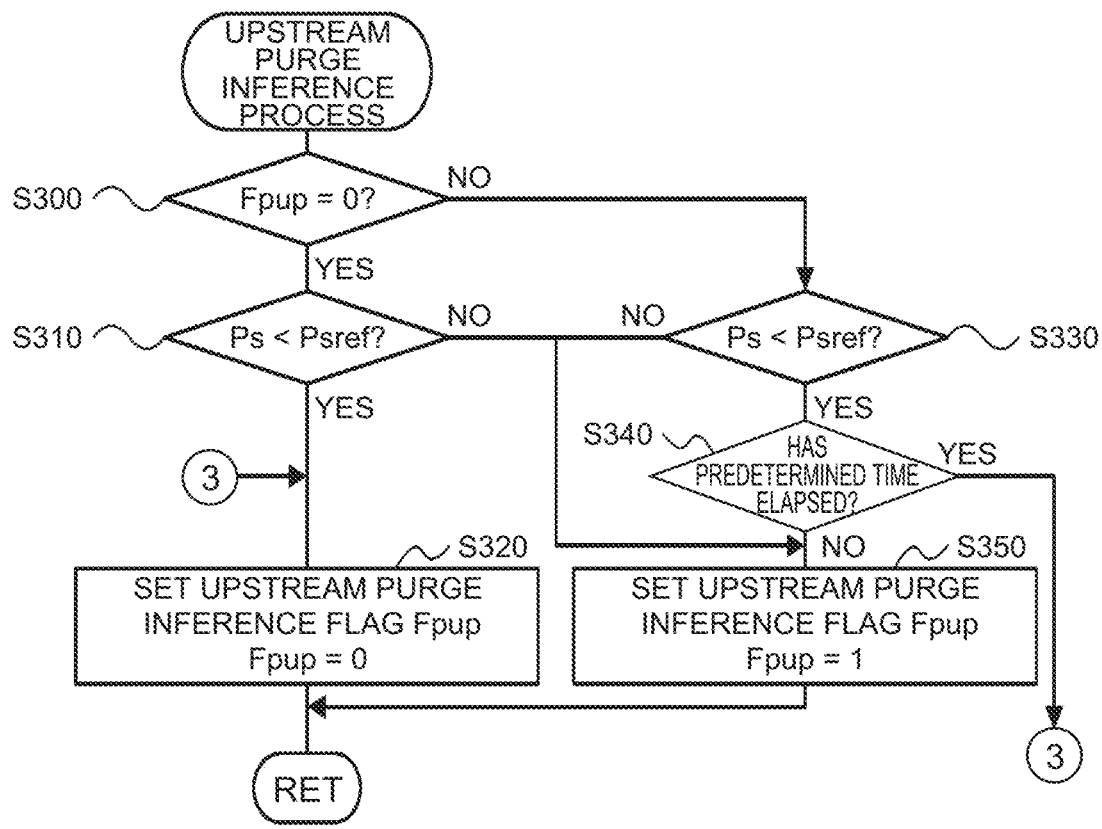
FIG. 5 is a flowchart showing one example of an upstream purge inference process.

In the upstream purge inference process of FIG. 5, the electronic control unit 70 first checks the value of the upstream purge inference flag that was set when this upstream purge inference process was executed last time (previous Fpup) (step S300). When the previous value of the upstream purge inference flag (previous Fpup) is zero, i.e., when it is inferred that the purge does not include the upstream purge (includes only the downstream purge), the surge pressure Ps and a threshold value Psref are compared (step S310). The threshold value Psref is a threshold value used to infer whether the purge includes the upstream purge, and is specified in advance by experiment or analysis. As the threshold value Psref, for example, about −6 kPa to −9 kPa is used.

When it is determined in step S310 that the surge pressure Ps is lower than the threshold value Psref, it is inferred that the purge does not include the upstream purge. The value of the upstream purge inference flag Fpup is set to zero, i.e., the value zero is retained (step S320), and this routine is ended. When it is determined in step S310 that the surge pressure Ps is equal to or higher than the threshold value Psref, it is inferred that the purge includes the upstream purge. The value of the upstream purge inference flag Fpup is set to one, i.e., the value is switched from zero to one (step S350), and this process is ended.

When the previous value of the upstream purge inference flag (previous Fpup) is one in step S300, i.e., when it is inferred that the purge includes the upstream purge, the surge pressure Ps and the threshold value Psref are compared (step S330). When it is determined that the surge pressure Ps is equal to or higher than the threshold value Psref, it is inferred that the purge includes the upstream purge. The value of the upstream purge inference flag Fpup is set to one, i.e., the value one is retained (step S350), and this process is ended.

When it is determined in step S330 that the surge pressure Ps is lower than the threshold value Psref, it is determined whether a predetermined time T1 has elapsed since the surge pressure Ps has become lower than the threshold value Psref (step S340). The predetermined time T1 will be described in detail later. When it is determined that the predetermined time T1 has not elapsed since the surge pressure Ps has become lower than the threshold value Psref, it is inferred that the purge includes the upstream purge. The value of the upstream purge inference flag Fpup is set to one, i.e., the value one is retained (step S350), and this process is ended. When it is determined that the predetermined time T1 has elapsed since the surge pressure Ps has become lower than the threshold value Psref, it is inferred that the purge does not include the upstream purge (includes only the downstream purge). The value of the upstream purge inference flag Fpup is set to zero, i.e., the value is switched from one to zero (step S320), and this process is ended.

The predetermined time T1 is specified by experiment or analysis as a difference between a time taken for evaporated fuel gas to reach the surge tank 27 (combustion chamber 30) during the upstream purge and a time taken for evaporated fuel gas to reach the surge tank 27 (combustion chamber 30) during the downstream purge. Since the path by which evaporated fuel gas reaches the surge tank 27 during the upstream purge is longer than the path by which evaporated fuel gas reaches the surge tank 27 during the downstream purge, the time taken for evaporated fuel gas to reach the surge tank 27 during the upstream purge is longer than the time taken for evaporated fuel gas to reach the surge tank 27 during the downstream purge. It is therefore assumed that, when the surge pressure Ps that has been equal to or higher than the threshold value Psref becomes lower than the threshold value Psref, for some time, evaporated fuel gas remaining in the second purge passage 63 and evaporated fuel gas newly supplied to the first purge passage 62 merge in the intake pipe 23, downstream of the throttle valve 26, and is supplied to the surge tank 27 (combustion chamber 30). In the embodiment, based on this assumption, when the value of the upstream purge inference flag Fpup is one, the electronic control unit 70 switches the value of the upstream purge inference flag Fpup to zero after waiting for the predetermined time T1 to elapse after the surge pressure Ps that has been equal to or higher than the threshold value Psref becomes lower than the threshold value Psref. Thus, whether the purge includes the upstream purge (or includes only the downstream purge) can be more appropriately inferred.

Figure 6:
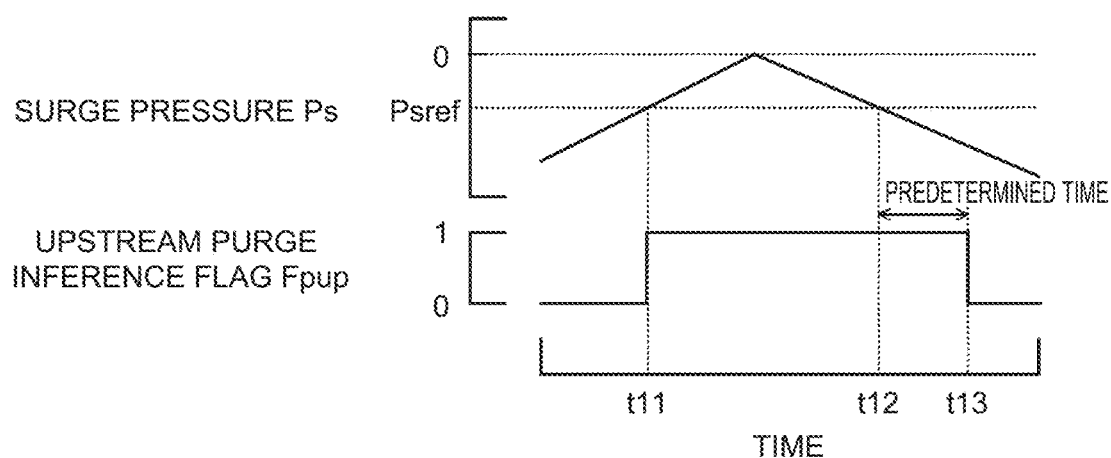
FIG. 6 is a chart illustrating one example of the states of a surge pressure Ps and an upstream purge inference flag Fpup.

FIG. 6 is a chart illustrating one example of the states of the surge pressure Ps and the upstream purge inference flag Fpup. As shown, when the surge pressure Ps becomes equal to or higher than the threshold value Psref while the value of the upstream purge inference flag Fpup is zero (time t11), the value of the upstream purge inference flag Fpup is switched to one. Thereafter, when the surge pressure Ps becomes lower than the threshold value Psref (time t12) and the predetermined time T1 elapses with the surge pressure Ps lower than the threshold value Psref (time t13), the value of the upstream purge inference flag Fpup is switched to zero.

The upstream purge inference process of FIG. 5 has been described. The description of the purge control routine of FIG. 3 and FIG. 4 will be resumed. When the upstream purge inference flag Fpup is set in step S110, it is determined whether the value of the purge condition flag when this routine was executed last time (previous Fpc) is one (step S120). This process is a process of determining whether the purge condition was met and a driving duty Ddr was set by a process to be described later when this routine was executed last time.

Figure 7:
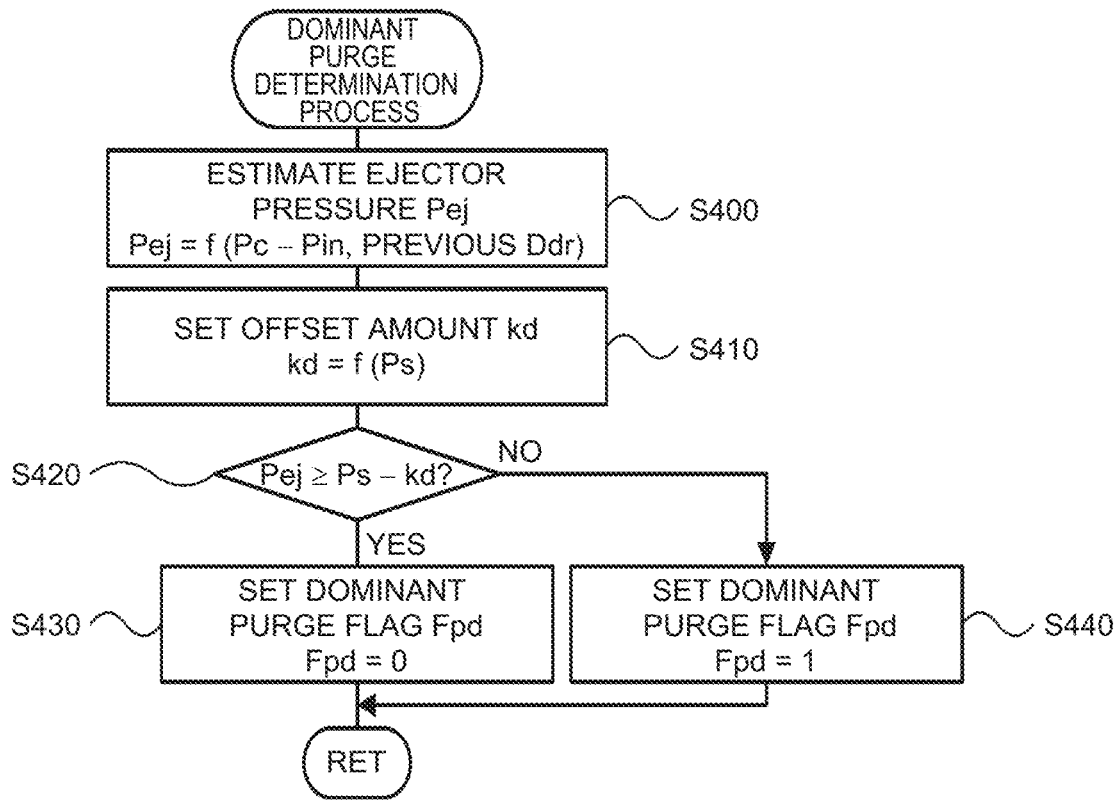
FIG. 7 is a flowchart showing one example of a dominant purge determination process.

When it is determined in step S120 that the previous value of the purge condition flag (previous Fpc) is one, it is concluded that the driving duty Ddr was set when this routine was executed last time, and a dominant purge flag Fpd is set by the dominant purge determination process of FIG. 7 (step S140). The dominant purge flag Fpd is a flag indicating which of the downstream purge and the upstream purge is a dominant purge that is dominant one of the two, and the value thereof is set to zero when it is determined that the dominant purge is the downstream purge (evaporated fuel gas flows dominantly through the first purge passage 62), and is set to one when it is determined that the dominant purge is the upstream purge (evaporated fuel gas flows dominantly to the second purge passage 63). The value of the dominant purge flag Fpd is set to zero as an initial value when a trip is started. Here, the description of the purge control routine of FIG. 3 and FIG. 4 will be suspended to describe the dominant purge determination process of FIG. 7.

Figure 8:
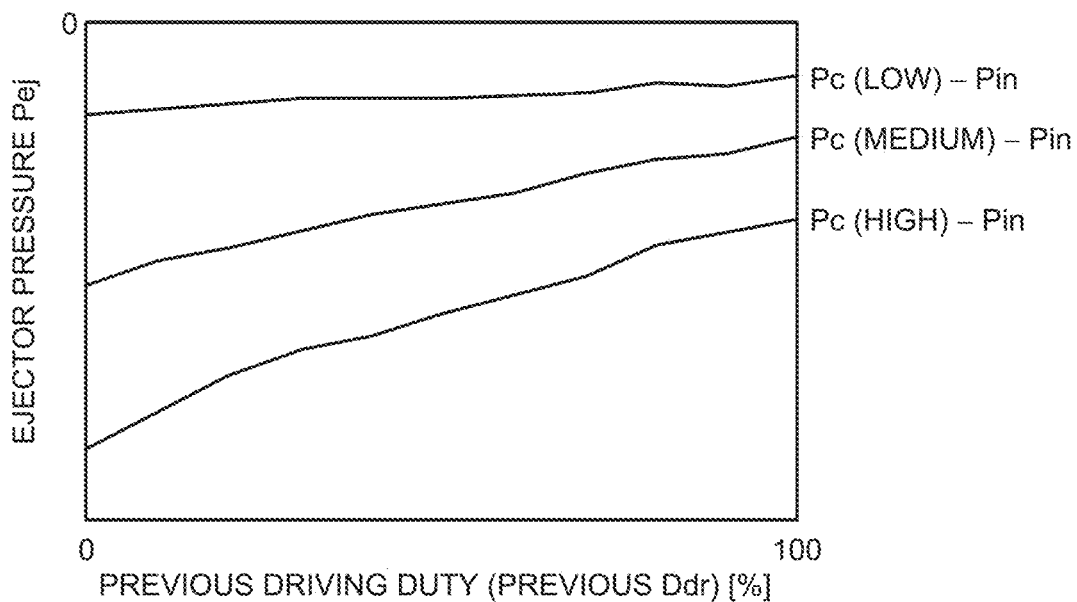
FIG. 8 is a graph illustrating one example of an ejector pressure setting map.

In the dominant purge determination process of FIG. 7, the electronic control unit 70 first estimates an ejector pressure Pej based on a value obtained by subtracting the intake air pressure Pin from the supercharging pressure Pc and on the driving duty that was set when the purge control routine of FIG. 3 and FIG. 4 was executed last time (previous Ddr) (step S400). The ejector pressure Pej can be obtained by applying the value obtained by subtracting the intake air pressure Pin from the supercharging pressure Pc and the previous driving duty (previous Ddr) to an ejector pressure setting map. The ejector pressure setting map is specified in advance by experiment or analysis as a relationship among the value obtained by subtracting the intake air pressure Pin from the supercharging pressure Pc, the previous driving duty (previous Ddr), and the ejector pressure Pej, and is stored in the ROM or the flash memory (not shown). FIG. 8 is a graph illustrating one example of the ejector pressure setting map. As shown, the ejector pressure Pej is set so as to become higher (have a smaller absolute value as a negative value) as the previous driving duty (previous Ddr) becomes higher, and become lower (have a larger absolute value as a negative value) as the supercharging pressure Pc (the value obtained by subtracting the intake air pressure Pin from the supercharging pressure Pc) becomes higher.

Figure 9:
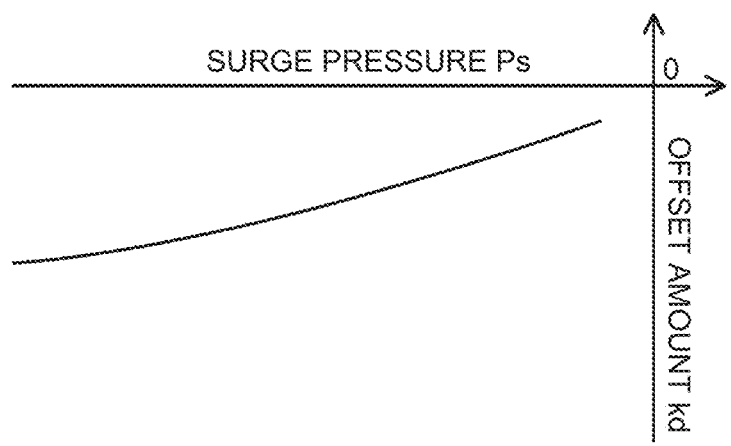
FIG. 9 is a graph illustrating one example of an offset amount setting map when the cross-sectional area of a second purge passage 63 is small relatively to the cross-sectional area of a first purge passage 62.

Subsequently, based on the surge pressure Ps, an offset amount kd is set by which the surge pressure Ps is offset to correct the influence of the cross-sectional area of the second purge passage 63 relative to the cross-sectional area of the first purge passage 62 (step S410). The offset amount kd can be obtained by applying the surge pressure Ps to an offset amount setting map. The offset amount setting map is specified in advance by experiment or analysis as a relationship between the surge pressure Ps and the offset amount kd, and is stored in the ROM or the flash memory (not shown). FIG. 9 is a graph illustrating one example of the offset amount setting map when the cross-sectional area of the second purge passage 63 is small relatively to the cross-sectional area of the first purge passage 62. As shown, the offset amount kd is set such that the absolute value thereof as a negative value becomes larger as the absolute value of the surge pressure Ps as a negative value becomes larger. This is because the influence based on the cross-sectional area of the second purge passage 63 relative to the cross-sectional area of the first purge passage 62 becomes greater as the absolute value of the surge pressure Ps as a negative value becomes larger. When the first purge passage 62 and the second purge passage 63 are formed by pipes, since the cross-sectional area is proportional to the square of the pipe diameter, the influence based on the cross-sectional area of the second purge passage 63 relative to the cross-sectional area of the first purge passage 62 can be rephrased as an influence based on the pipe diameter of the second purge passage relative to the pipe diameter of the first purge passage 62.

Then, the ejector pressure Pej and a value obtained by subtracting the offset amount kd from the surge pressure Ps are compared (step S420). When it is determined that the ejector pressure Pej is equal to or higher than the value obtained by subtracting the offset amount kd from the surge pressure Ps (the absolute value of the ejector pressure Pej as a negative value is equal to or smaller than that value), it is concluded that the evaporated fuel gas flows dominantly through the first purge passage 62 (that the dominant purge is the downstream purge). The value of the dominant purge flag Fpd is set to zero (step S430), and this process is ended. When it is determined in step S420 that the ejector pressure Pej is smaller than the value obtained by subtracting the offset amount kd from the surge pressure Ps (the absolute value of the ejector pressure Pej as a negative value is larger than that value), it is concluded that the evaporated fuel gas flows dominantly through the second purge passage 63 (that the dominant purge is the upstream purge). The value of the dominant purge flag Fpd is set to one (step S440), and this process is ended.

Thus, in the embodiment, the offset amount kd for correcting the influence of the cross-sectional area of the second purge passage relative to the cross-sectional area of the first purge passage 62 is set based on the surge pressure Ps, and the ejector pressure Pej and the value obtained by subtracting the offset amount kd from the surge pressure Ps are compared to determine which of the downstream purge and the upstream purge is the dominant purge. In this way, which of the downstream purge and the upstream purge is the dominant purge can be more appropriately determined than when the influence based on the cross-sectional area of the second purge passage relative to the cross-sectional area of the first purge passage 62 is not taken into account.

The dominant purge determination process of FIG. 7 has been described. The description of the purge control routine of FIG. 3 and FIG. 4 will be resumed. When the dominant purge flag Fpd is set in step S140, the set value of the dominant purge flag Fpd is checked (step S150). When the value of the dominant purge flag Fpd is zero, i.e., when it is determined that the dominant purge is the downstream purge, it is concluded that a natural aspiration range applies, and the value of a supercharging range flag Fc is set to zero (step S160). When the value of the dominant purge flag Fpd is one, i.e., when it is determined that the upstream purge is dominant, it is concluded that a supercharging range applies, and the value of the supercharging range flag Fc is set to one (step S170).

When it is determined in step S120 that the previous value of the purge condition flag (previous Fpc) is zero, it is concluded that the driving duty Ddr was not set when this routine was executed last time, and the value of the upstream purge inference flag Fpup is checked (step S130). When the value of the upstream purge inference flag Fpup is zero, i.e., when it is inferred that the purge does not include the upstream purge (includes only the downstream purge), it is concluded that the natural aspiration range applies, and the value of the supercharging range flag Fc is set to zero (step S160). When the value of the upstream purge inference flag Fpup is one, i.e., when it is inferred that the purge includes the upstream purge, it is concluded that the supercharging range applies, and the value of the supercharging range flag Fc is set to one (step S170). When the previous value of the purge condition flag (previous Fpc) is zero, the driving duty Ddr was not set when this routine was executed last time, so that the ejector pressure Pej cannot be estimated and the dominant purge flag Fpd cannot be set by the dominant purge determination process of FIG. 7. In this case, therefore, the supercharging range flag Fc is set using the upstream purge inference flag Fpup instead of the dominant purge flag Fpd.

When the supercharging range flag Fc is thus set in step S160 or step S170, it is determined whether the value of the purge condition flag Fpc is one (step S180). When it is determined that the value of the purge condition flag Fpc is zero, i.e., when the purge condition is not met, this routine is ended. In this case, the purge control valve 65 is closed.

When it is determined in step S180 that the value of the purge condition flag Fpc is one, i.e., when the purge condition is met, a target purge ratio Rptg is set based on the supercharging range flag Fc (step S200). The target purge ratio Rptg is set so as to increase gradually from a starting purge ratio Rpst1 (e.g., by rate processing using a rate value ΔRp1) during a period in which the purge condition is met for the first time in each trip (a period from when the purge condition starts to be met until meeting of the purge condition is interrupted or ended). Further, the target purge ratio Rptg is set so as to increase gradually from a resuming purge ratio Rpst2 (e.g., by rate processing using a rate value ΔRp2) during a period in which the purge condition is met for the second time or a subsequent time in each trip (a period from when meeting of the purge condition is resumed until it is interrupted or ended). As the starting purge ratio Rpst1 and the resuming purge ratio Rpst2, relatively small values are used to mitigate fluctuations in the air-fuel ratio of the engine 12. At least one of the value of the starting purge ratio Rpst1, the value of the resuming purge ratio Rpst2, and the rate values ΔRp1, ΔRp2 is set to a smaller value when the value of the supercharging range flag Fc is one, i.e., when it is determined that the supercharging range applies, than when the value of the supercharging range flag Fc is zero, i.e., when it is determined that the natural aspiration range applies. Examples of the case where meeting of the purge condition is interrupted include a case where an accelerator pedal is released and fuel to the engine 12 is cut off (the operation control of the engine 12 is interrupted) while the vehicle equipped with the engine device 10 is traveling. The "purge ratio" means the ratio of the amount of evaporated fuel gas to the intake air amount.

Subsequently, an upper-limit purge ratio Rplim is set based on the supercharging range flag Fc (step S210). In the embodiment, the value of the upper-limit purge ratio Rplim is set to a smaller value when it is determined that the value of the supercharging range flag Fc is one, i.e., when it is determined that the supercharging range applies, than when the value of the supercharging range flag Fc is zero, i.e., when it is determined that the natural aspiration range applies. The upper-limit purge ratio Rplim is used to mitigate fluctuations in the air-fuel ratio of the engine 12.

Figure 10:
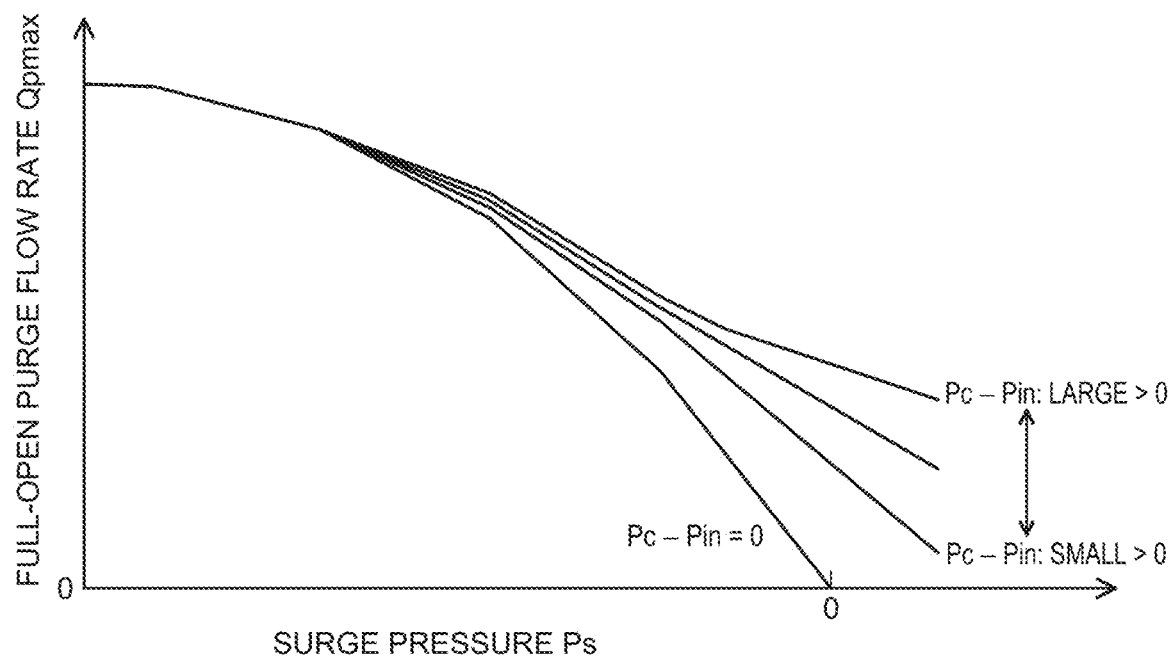
FIG. 10 is a graph illustrating one example of a full-open purge flow rate estimation map.

Then, a full-open purge flow rate Qpmax is estimated based on the surge pressure Ps and the value obtained by subtracting the intake air pressure Pin from the supercharging pressure Pc (step S220). The full-open purge flow rate Qpmax is a purge flow rate (the volume flow rate of the evaporated fuel gas supplied to the intake pipe 23) when the driving duty of the purge control valve 65 is 100%. The full-open purge flow rate Qpmax can be obtained by applying the surge pressure Ps and the value obtained by subtracting the intake air pressure Pin from the supercharging pressure Pc to a full-open purge flow rate estimation map. The full-open purge flow rate estimation map is specified in advance by experiment or analysis as a relationship among the surge pressure Ps, the value obtained by subtracting the intake air pressure Pin from the supercharging pressure Pc, and the full-open purge flow rate Qpmax, and is stored in the ROM or the flash memory (not shown). FIG. 10 is a graph illustrating one example of the full-open purge flow rate estimation map. As shown, the full-open purge flow rate Qpmax is set so as to become higher as the surge pressure Ps becomes lower (the absolute value thereof as a negative value becomes larger) and as the value obtained by subtracting the intake air pressure Pin from the supercharging pressure Pc becomes larger.

In addition, a combustion chamber air amount Qcc that is an amount of air inside the combustion chamber 30 is estimated based on the intake air amount Qa and the pre-valve purge flow rate (past Qpv) of a predetermined time T2 ago (step S230). The pre-valve purge flow rate Qpv is a flow rate of the evaporated fuel gas in the common passage 61, on the side of the introduction passage 52 relative to the purge control valve 65. If a purge was being executed the predetermined time T2 ago, a value that was estimated by a process, to be described later, during execution of this routine of the predetermined time T2 ago is used as the pre-valve purge flow rate (past Qpv) of the predetermined time T2 ago, and if a purge was not being executed the predetermined time T2 ago, zero is used as the value of the pre-valve purge flow rate of the predetermined time T2 ago. The predetermined time T2 is specified as a time taken for the evaporated fuel gas in the common passage 61, on the side of the introduction passage 52 relative to the purge control valve 65, to reach the combustion chamber 30. As the predetermined time T2, a time based on the supercharging range flag Fc, the speed Ne of the engine 12, etc. may be used, or for simplicity's sake, a fixed time may be used. The combustion chamber air amount Qcc can be obtained by, for example, applying the intake air amount Qa and the past pre-valve purge flow rate (past Qpv) to a combustion chamber air amount estimation map. The combustion chamber air amount estimation map is specified in advance by experiment or analysis as a relationship between the intake air amount Qa and the past pre-valve purge flow rate (past Qpv), and the combustion chamber air amount Qcc, and is stored in the ROM or the flash memory (not shown).

When the full-open purge flow rate Qpmax and the combustion chamber air amount Qcc are thus estimated, a full-open purge ratio Rpmax is estimated based on these full-open purge flow rate Qpmax and combustion chamber air amount Qcc (step S240). The full-open purge ratio Rpmax can be calculated by dividing the full-open purge flow rate Qpmax by the combustion chamber air amount Qcc. Subsequently, the driving duty Ddr is set by a driving duty setting process to be described later (step S250), and the purge control valve 65 is controlled using the set driving duty Ddr (step S260).

Then, the pre-valve purge flow rate Qpv is estimated based on the intake air amount Qa and a required purge ratio Rprq (step S270), and this routine is ended. The pre-valve purge flow rate Qpv can be obtained by, for example, applying the intake air amount Qa and the required purge ratio Rprq to a pre-valve purge flow rate estimation map. The pre-valve purge flow rate estimation map is specified in advance by experiment or analysis as a relationship between the intake air amount Qa and the required purge ratio Rprq, and the pre-valve purge flow rate Qpv, and is stored in the ROM or the flash memory (not shown).

Thus, in the embodiment, the target purge ratio Rptg (at least one of the starting purge ratio Rpst1, the resuming purge ratio Rpst2, and the rate values ΔRp1, ΔRp2) and the upper-limit purge ratio Rplim are varied according to which of the natural aspiration range and the supercharging range applies. When the supercharging range applies, compared with when the natural aspiration range applies, the fuel injection control tends to make the air-fuel ratio of the engine 12 unstable during execution of a purge due to factors including a longer time taken for the evaporated fuel gas to reach the combustion chamber 30 of the engine 12 and fluctuations of the supercharging pressure Pc, both attributable to the longer path to the combustion chamber 30. In the embodiment, the target purge ratio Rptg and the upper-limit purge ratio Rplim are set to be lower when the supercharging range applies than when the natural aspiration range applies, which can mitigate the instability of the air-fuel ratio of the engine 12 resulting from the fuel injection control.

Next, the process in step S250 of the purge control routine of FIG. 3 and FIG. 4, i.e., the process of setting the driving duty Ddr, will be described using the driving duty setting process of FIG. 11. In the driving duty setting process of FIG. 11, the electronic control unit 70 first determines whether the ejector pressure Pej has been set during execution of the purge control routine of FIG. 3 and FIG. 4 this time (whether the process in step S140 (the dominant purge setting process of FIG. 7) has been executed) (step S500). Since it is assumed that the purge condition is met (see step S180 of FIG. 3 and FIG. 4), and the dominant purge determination process of FIG. 7 is executed when the previous value of the purge condition flag (previous Fpc) is one (see steps S130 and S140 of FIG. 3 and FIG. 4), when the ejector pressure Pej has been set this time, this means that the purge condition is continuously met, and when the ejector pressure Pej has not been set this time, this means that the purge condition has just switched from being not met to being met.

Figure 12:
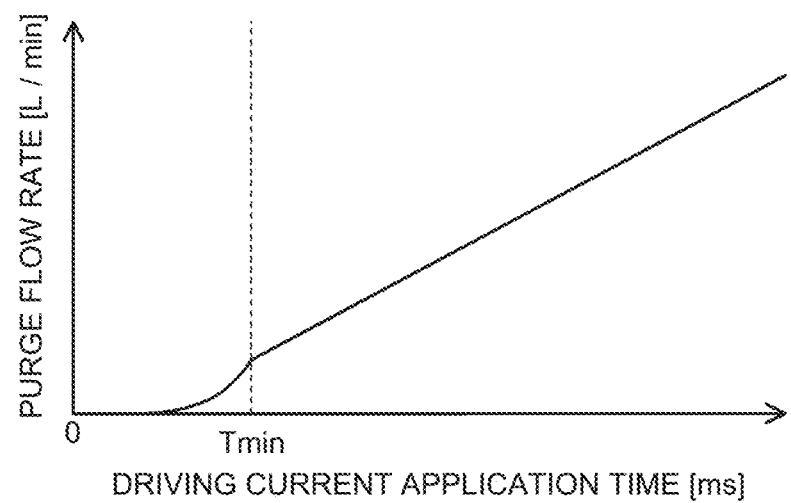
FIG. 12 is a graph illustrating one example of a relationship between a driving current application time of a purge control valve 65 and a purge flow rate.
Figure 13:
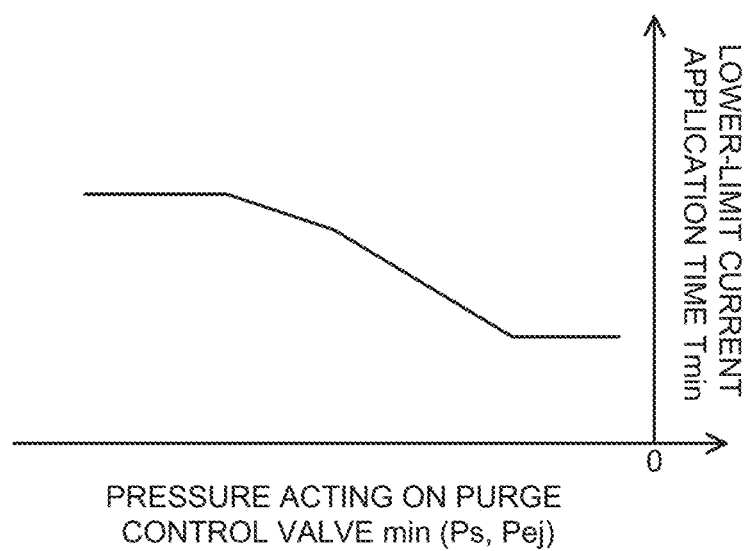
FIG. 13 is a graph illustrating one example of a lower-limit current application time setting map.

When it is determined in step S500 that the ejector pressure Pej has been set this time, i.e., when the purge condition is continuously met, a lower-limit current application time Tmin of the purge control valve 65 is set based on one of the surge pressure Ps and the ejector pressure Pej, whichever is lower (higher as a negative pressure) (step S510). The lower-limit current application time Tmin of the purge control valve 65 is a time at which a relationship between a time from when the purge control valve 65 is opened (driving current application time) and the purge flow rate switches from a non-linear shape to a linear shape. FIG. 12 is a graph illustrating one example of the relationship between the driving current application time of the purge control valve 65 and the purge flow rate. As shown, when the driving current application time is shorter than the lower-limit current application time Tmin, the relationship between the driving current application time and the purge flow rate has a non-linear shape. When the driving current application time becomes equal to or longer than the lower-limit current application time Tmin, the relationship between the driving current application time and the purge flow rate has a linear shape. The lower-limit current application time Tmin is affected by a pressure acting on the purge control valve 65, specifically, one of the surge pressure Ps and the ejector pressure Pej, whichever is lower (higher as a negative pressure). In the embodiment, therefore, a relationship between the pressure acting on the purge control valve 65 and the lower-limit current application time Tmin is specified in advance by experiment or analysis and stored as a lower-limit current application time setting map in the ROM or the flash memory (not shown). The lower-limit current application time Tmin is set by applying the pressure acting on the purge control valve 65 to this lower-limit current application time setting map. FIG. 13 is a graph illustrating one example of the lower-limit current application time setting map. As shown, the lower-limit current application time Tmin is set so as to become longer as the pressure acting on the purge control valve 65 becomes lower (higher as a negative pressure).

When the lower-limit current application time Tmin of the purge control valve 65 is thus set, a value obtained by dividing the set lower-limit current application time Tmin of the purge control valve 65 by a driving period Tprd of the purge control valve 65 is set as a lower-limit duty Dmin of the purge control valve 65 (step S520), and the product of the full-open purge ratio Rpmax and the lower-limit duty Dmin is set as a lower-limit purge ratio Rpmin (step S530). As described above, the lower-limit current application time Tmin of the purge control valve 65 is the time at which the relationship between the driving current application time of the purge control valve 65 and the purge flow rate switches from a non-linear shape to a linear shape. Therefore, the lower-limit purge ratio Rpmin means a purge ratio at which the relationship between the driving current application time of the purge control valve 65 and the purge flow rate switches from a non-linear shape to a linear shape (a lower limit of a range of the purge ratio in which the purge flow rate can be accurately controlled by controlling the opening degree Opv of the purge control valve 65).

Subsequently, the upper-limit purge ratio Rplim set in step S210 of the purge control routine of FIG. 3 and FIG. 4 is compared with the lower-limit purge ratio Rpmin (step S540). When the upper-limit purge ratio Rplim is equal to or higher than the lower-limit purge ratio Rpmin, as shown in Formula (1), the required purge ratio Rprq is set by limiting the target purge ratio Rptg by the full-open purge ratio Rpmax and the upper-limit purge ratio Rplim (by setting an upper limit) and then limiting the resulting value by the lower-limit purge ratio Rpmin (by setting a lower limit) (step S550). Specifically, either the lower-limit purge ratio Rpmin or the smallest value of the target purge ratio Rptg, the full-open purge ratio Rpmax, and the upper-limit purge ratio Rplim, whichever is larger, is set as the required purge ratio Rprq. Then, a value obtained by dividing the required purge ratio Rprq by the full-open purge ratio Rpmax is set as the driving duty Ddr of the purge control valve 65 (step S580), and this process is ended.

$$Rprq = \max(\min(Rptg, Rp\max, Rp\lim), Rp\min) \qquad (1)$$

When the upper-limit purge ratio Rplim is lower than the lower-limit purge ratio Rpmin in step S540, the value of the required purge ratio Rprq is set to zero (step S570). A value obtained by dividing the required purge ratio Rprq by the full-open purge ratio Rpmax, i.e., zero, is set as the driving duty Ddr of the purge control valve 65 (step S580), and this process is ended. If the required purge ratio Rprq is set by the above Formula (1) when the upper-limit purge ratio Rplim is lower than the lower-limit purge ratio Rpmin, the required purge ratio Rprq becomes higher than the upper-limit purge ratio Rplim, which may cause fluctuations in the air-fuel ratio of the engine 12. In the embodiment, therefore, when the upper-limit purge ratio Rplim is lower than the lower-limit purge ratio Rpmin, the value of the required purge ratio Rprq is set to zero and the value of the driving duty Ddr is set to zero. This can mitigate fluctuations in the air-fuel ratio of the engine 12.

When it is determined in step S500 that the ejector pressure Pej has not been set this time, i.e., when the purge condition has switched from being not met to being met, the value of the lower-limit purge ratio Rpmin is set to zero (step S560), and the value of the required purge ratio Rprq is set to zero (step S570). A value obtained by dividing the required purge ratio Rprq by the full-open purge ratio Rpmax, i.e., zero, is set as the driving duty Ddr of the purge control valve 65 (step S580), and this process is ended. When the ejector pressure Pej has not been set this time, the lower-limit current application time Tmin cannot be set and therefore the lower-limit purge ratio Rpmin cannot be set. In the embodiment, in this case, the values of the lower-limit purge ratio Rpmin and the required purge ratio Rprq are set to zero. Thus, when the ejector pressure Pej has not been set this time, the purge control valve 65 can be controlled by setting the required purge ratio Rprq. Moreover, in this case, since the value of the required purge ratio Rprq is set to zero, a situation where the value of the required purge ratio Rprq is set to a positive value near zero can be avoided, and thereby a situation where the purge control valve 65 is controlled in a range in which the relationship between the driving current application time of the purge control valve 65 and the purge flow rate has a non-linear shape can be avoided. As a result, fluctuations in the air-fuel ratio of the engine 12 can be mitigated.

In the engine device 10 of the embodiment having been described above, when the purge condition is continuously met, i.e., when the ejector pressure Pej is estimated based on the value obtained by subtracting the intake air pressure Pin from the supercharging pressure Pc and on the previous driving duty (previous Ddr), the lower-limit current application time Tmin is estimated based on the surge pressure Ps and the ejector pressure Pej. Then, the lower-limit purge ratio Rpmin is set based on the estimated lower-limit current application time Tmin, and the required purge ratio Rprq is set using the target purge ratio Rptg and the lower-limit purge ratio Rpmin. On the other hand, immediately after the purge condition switches from being not met to being met, i.e., when the ejector pressure Pej is not estimated, the values of the lower-limit purge ratio Rpmin and the required purge ratio Rprq are set to zero. Thus, the purge control valve 65 can be controlled immediately after the purge condition switches from being not met to being met. Moreover, in this case, since the value of the required purge ratio Rprq is set to zero, a situation where the value of the required purge ratio Rprq is set to a positive value near zero can be avoided, and thereby a situation where the purge control valve 65 is controlled in a range in which the relationship between the driving current application time of the purge control valve 65 and the purge flow rate has a non-linear shape can be avoided. As a result, fluctuations in the air-fuel ratio of the engine 12 can be mitigated.

Figure 11:
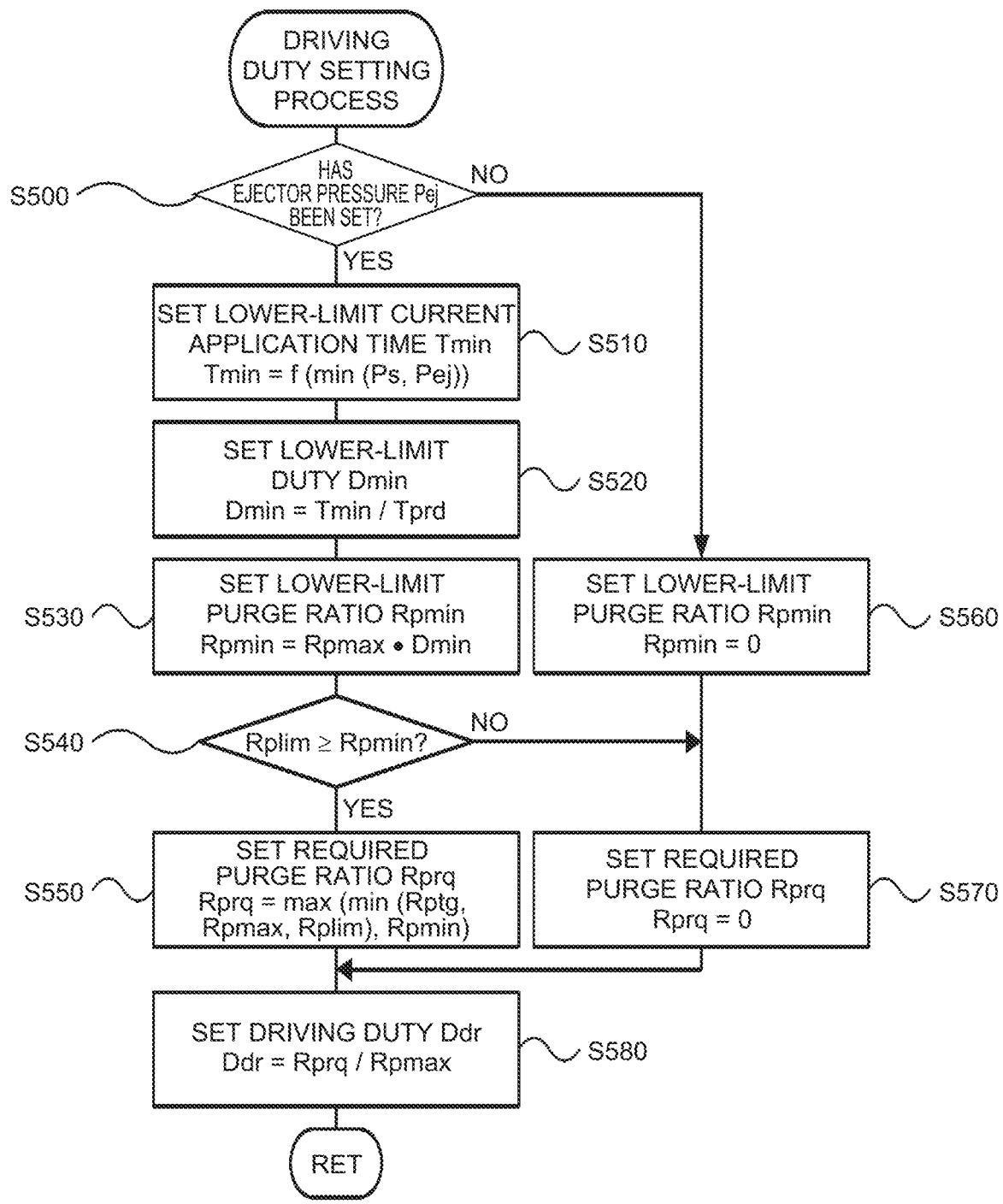
FIG. 11 is a flowchart showing one example of a driving duty setting process.
Figure 14:
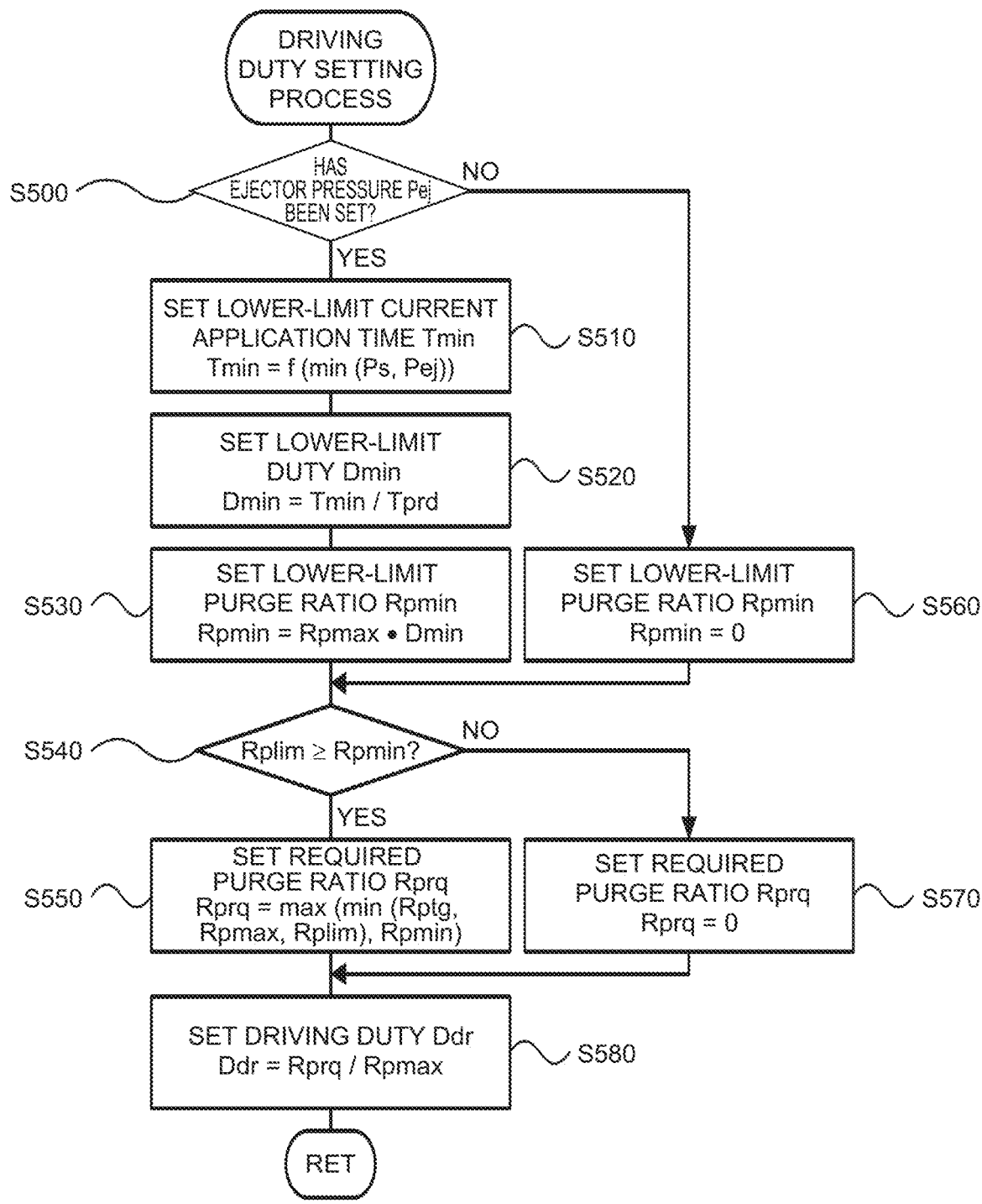
FIG. 14 is a flowchart showing one example of a driving duty setting process.

In the engine device 10 of the embodiment, the electronic control unit 70 executes the driving duty setting process of FIG. 11. However, instead of this, the driving duty setting process of FIG. 14 may be executed. The driving duty setting process of FIG. 14 is different from the driving duty setting process of FIG. 11 in that the electronic control unit 70 moves to step S540, instead of step S570, after step S560. Therefore, the steps of the driving duty setting process of FIG. 14 are denoted by the same step numbers as in the driving duty setting process of FIG. 11.

In the driving duty setting process of FIG. 14, when the electronic control unit 70 sets the value of the lower-limit purge ratio Rpmin to zero in step S560, the upper-limit purge ratio Rplim becomes equal to or higher than the lower-limit purge ratio Rpmin in step S540, and the required purge ratio Rprq is set by Formula (1) in step S550. In step S580, a value obtained by dividing the required purge ratio Rprq by the full-open purge ratio Rpmax is set as the driving duty Ddr of the purge control valve 65, and this process is ended. Also in this case, the purge control valve 65 can be controlled immediately after the purge condition switches from being not met to being met, i.e., when the ejector pressure Pej is not estimated. In this case, since the required purge ratio Rprq is set using the lower-limit purge ratio Rpmin of which the value is zero, it is possible that the required purge ratio Rprq may be set to a positive value near zero and that the purge control valve 65 may be controlled in a range in which the relationship between the driving current application time of the purge control valve 65 and the purge flow rate has a non-linear shape.

Figure 15:
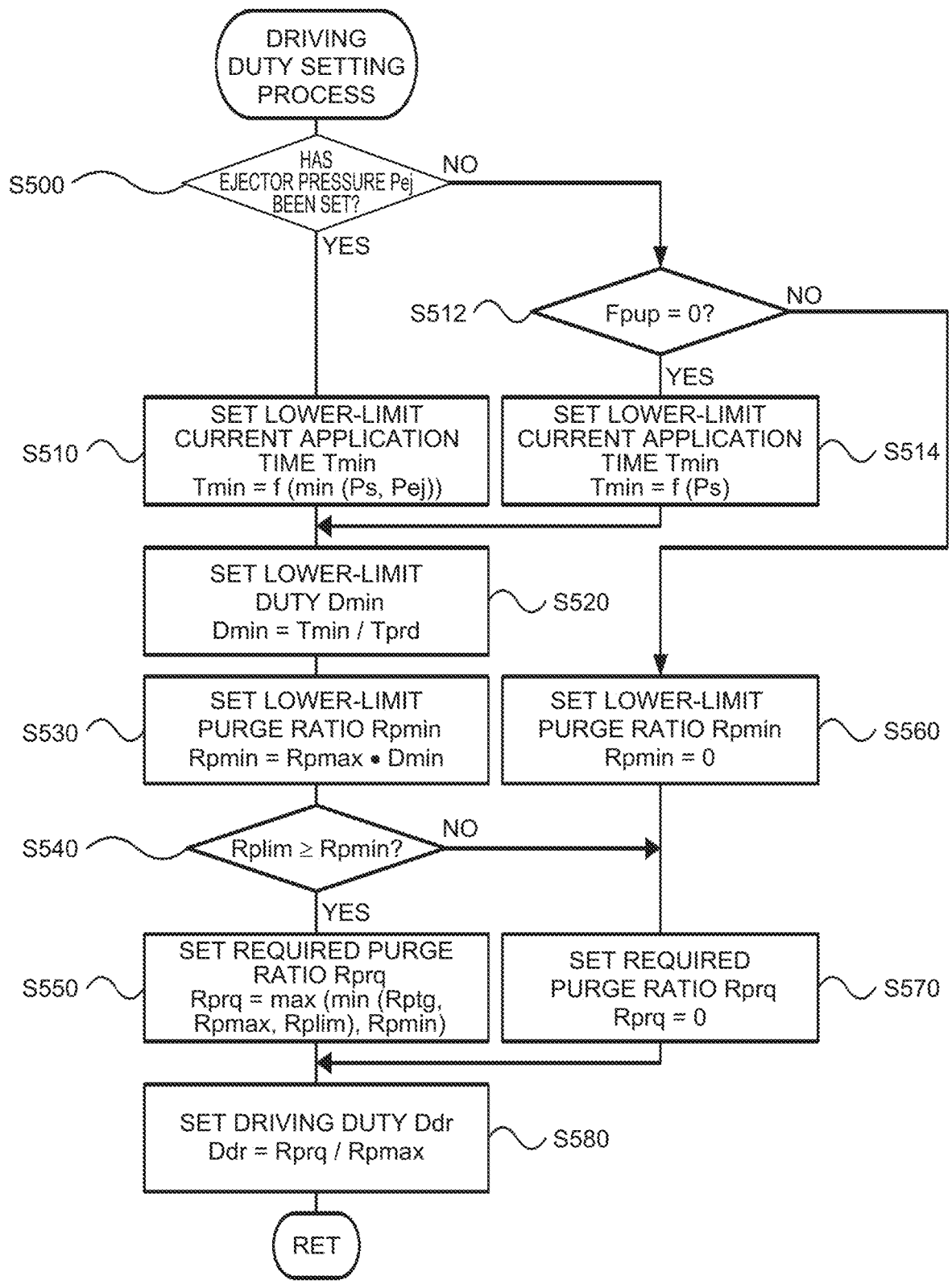
FIG. 15 is a flowchart showing one example of the driving duty setting process.

In the engine device 10 of the embodiment, the electronic control unit 70 executes the driving duty setting process of FIG. 11. However, instead of this, the driving duty setting process of FIG. 15 may be executed. The driving duty setting process of FIG. 15 is different from the driving duty setting process of FIG. 11 in that the process in steps S512 and S514 is added. Therefore, those steps of the driving duty setting process of FIG. 15 that are the same as in the driving duty setting process of FIG. 11 are denoted by the same step numbers.

In the driving duty setting process of FIG. 15, when it is determined that the ejector pressure Pej has not been set this time, i.e., when the purge condition has switched from being not met to being met, the electronic control unit 70 checks the value of the upstream purge inference flag Fpup (step S512). When the value of the upstream purge inference flag Fpup is one, i.e., when it is inferred that the purge includes the upstream purge, the electronic control unit 70 moves to step S560. When the value of the upstream purge inference flag Fpup is zero, i.e., when it is inferred that the purge does not include the upstream purge, the electronic control unit 70 sets the lower-limit current application time Tmin based on the surge pressure Ps (step S514), and moves to step S520. In the process in step S514, the lower-limit current application time Tmin can be set by applying the surge pressure Ps to a map that is the map of FIG. 13 with the abscissa "one of the surge pressure Ps and the ejector pressure Pej, whichever is lower (higher as a negative pressure)" replaced with "the surge pressure Ps." When it is inferred that the purge does not include the upstream purge, it is assumed that the surge pressure Ps is sufficiently lower (higher as a negative pressure) than the ejector pressure Pej. Therefore, the lower-limit current application time Tmin may be set based on the surge pressure Ps.

In the engine device 10 of the embodiment, when setting the lower-limit current application time Tmin of the purge control valve 65, the lower-limit current application time Tmin of the purge control valve 65 is set based on one of the surge pressure Ps and the ejector pressure Pej, whichever is lower (higher as a negative pressure). However, the lower-limit current application time Tmin of the purge control valve 65 may be set based on one of the value obtained by subtracting the offset amount kd from the ejector pressure Pej and the surge pressure Ps, whichever is lower. Thus, the lower-limit current application time Tmin of the purge control valve 65 can be more appropriately set with the influence based on the pipe diameter of the second purge passage relative to the pipe diameter of the first purge passage 62 taken into account.

In the engine device 10 of the embodiment, the target purge ratio Rptg (at least one of the starting purge ratio Rpst1, the resuming purge ratio Rpst2, and the rate values ΔRp1, ΔRp2) and the upper-limit purge ratio Rplim are varied based on the supercharging range flag Fc. However, only either the target purge ratio Rptg or the upper-limit purge ratio Rplim may be varied based on the supercharging range flag Fc, or other parameters related to control of the purge control valve 65 than the target purge ratio Rptg and the upper-limit purge ratio Rplim may be varied.

In the engine device 10 of the embodiment, the offset amount kd is set based on the surge pressure Ps, and which of the downstream purge and the upstream purge is the dominant purge is determined based on the ejector pressure Pej and the value obtained by subtracting the offset amount kd from the surge pressure Ps. However, which of the downstream purge and the upstream purge is the dominant purge may be determined based on the ejector pressure Pej and a value obtained by subtracting a fixed offset amount kd, irrelevant of the surge pressure Ps, from the surge pressure Ps. Also in this case, which of the downstream purge and the upstream purge is the dominant purge can be appropriately determined, albeit with less accuracy than in the embodiment, compared with when the influence based on the cross-sectional area of the second purge passage relative to the cross-sectional area of the first purge passage 62 is not taken into account.

In the engine device 10 of the embodiment, the engine 12 includes the cylinder injection valve 28 that injects fuel into the combustion chamber 30. However, in addition to or in place of the cylinder injection valve 28, the engine 12 may include a port injection valve that injects fuel into the suction port.

In the engine device 10 of the embodiment, the turbocharger 40 is configured as a turbocharger in which the compressor 41 disposed in the intake pipe 23 and the turbine 42 disposed in the exhaust pipe 35 are coupled to each other through the rotating shaft 43. Instead of this, the turbocharger 40 may be configured as a supercharger in which a compressor driven by the engine 12 or a motor is disposed in the intake pipe 23.

In the engine device 10 of the embodiment, the common passage 61 of the evaporated fuel processing device 50 is connected to the introduction passage 52, near the canister 56. However, the common passage 61 may be connected to the canister 56.

In the embodiment, the present disclosure is implemented in the form of the engine device 10 that is installed in ordinary cars or various hybrid cars. However, the present disclosure may be implemented in the form of an engine device that is installed in a vehicle other than a car, or in the form of an engine device that is installed in stationary equipment, such as construction equipment.

The correspondence relationships between major elements of the embodiment and major elements of the disclosure described in the section SUMMARY are as follows: The engine 12 in the embodiment corresponds to the "engine"; the turbocharger 40 corresponds to the "turbocharger"; the evaporated fuel processing device 50 corresponds to the "evaporated fuel processing device"; and the electronic control unit 70 corresponds to the "controller."

Since the embodiment is an example for specifically describing the mode for carrying out the disclosure described in the section SUMMARY, those correspondence relationships between the major elements of the embodiment and the major elements of the disclosure described in that section do not limit the elements of the disclosure described in that section. Thus, the disclosure described in the section SUMMARY should be interpreted based on the description in that section, and the embodiment is merely a specific example of the disclosure described in that section.

While the mode for carrying out the present disclosure has been described above using the embodiment, it should be understood that the present disclosure is in no way limited to such an embodiment but can be implemented in various forms within the scope of the gist of the disclosure.

The present disclosure is applicable to the engine device manufacturing industry and the like.

What is claimed is:

1. An engine device comprising:
   an engine that has a throttle valve disposed in an intake pipe and outputs power using fuel supplied from a fuel tank;
   a turbocharger having a compressor disposed in the intake pipe, upstream of the throttle valve;
   an evaporated fuel processing device having
   a supply passage that splits into a first purge passage and a second purge passage that are connected to the intake pipe, downstream of the throttle valve, and supplies evaporated fuel gas containing evaporated fuel generated inside the fuel tank to the intake pipe,
   an ejector having an intake port connected to a recirculation passage extending from the intake pipe, between the compressor and the throttle valve, an exhaust port connected to the intake pipe, upstream of the compressor, and a suction port connected to the second purge passage, and
   a purge control valve provided in the supply passage; and
   a controller that, when an execution condition for a purge of supplying the evaporated fuel gas to the intake pipe is met, sets a required purge ratio within a range equal to or higher than a lower-limit purge ratio, and controls the purge control valve using a driving duty based on the required purge ratio, wherein:
   when the execution condition is continuously met, the controller estimates an ejector pressure that is a pressure at the suction port of the ejector, based on a pressure difference between a supercharging pressure that is a pressure inside the intake pipe, between the compressor and the throttle valve, and a pre-compressor pressure that is a pressure inside the intake pipe, upstream of the compressor, and on the driving duty, and sets the lower-limit purge ratio based on a post-throttle-valve pressure that is a pressure inside the intake pipe, downstream of the throttle valve, and on the ejector pressure; and
   the controller sets the value of the lower-limit purge ratio to zero immediately after the execution condition switches from being not met to being met.

2. The engine device according to claim 1, wherein the controller sets the value of the lower-limit purge ratio to zero and sets the value of the required purge ratio to zero immediately after the execution condition switches from being not met to being met.

3. The engine device according to claim 1, wherein the controller sets the lower-limit purge ratio based on the post-throttle-valve pressure when, immediately after the execution condition switches from being not met to being met, the purge does not include a second purge of supplying the evaporated fuel gas to the intake pipe through the second purge passage.

4. The engine device according to claim 3, wherein, in an inference process in which it is inferred that the purge does not include the second purge when the post-throttle-valve pressure is lower than a threshold value and it is inferred that the purge includes the second purge when the post-throttle-valve pressure is equal to or higher than the threshold value, the controller maintains an inference that the purge includes the second purge until a predetermined time elapses when the post-throttle-valve pressure that has been equal to or higher than the threshold value becomes lower than the threshold value.

5. The engine device according to claim 1, wherein, when a variable upper-limit purge ratio is equal to or higher than the lower-limit purge ratio, the controller sets the required purge ratio within a range equal to or lower than the upper-limit purge ratio and equal to or higher than the lower-limit purge ratio, and when the upper-limit purge ratio is lower than the lower-limit purge ratio, the controller sets the value of the required purge ratio to zero.

* * * * *